US011995968B2

(12) United States Patent
Gustof et al.

(10) Patent No.: US 11,995,968 B2
(45) Date of Patent: May 28, 2024

(54) SYSTEMS, DEVICES, AND METHODS TO ELECTRONICALLY LURE PEOPLE AT A BUILDING

(71) Applicant: MOTOROLA SOLUTIONS, INC., Chicago, IL (US)

(72) Inventors: Grzegorz Gustof, Myslenice (PL); Sebastian Slup, Cracow (PL); Jakub Warzocha, Sandomierz (PL); Piotr Furman, Grojec (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 504 days.

(21) Appl. No.: 17/278,286

(22) PCT Filed: Oct. 5, 2018

(86) PCT No.: PCT/PL2018/050051
§ 371 (c)(1),
(2) Date: Mar. 19, 2021

(87) PCT Pub. No.: WO2020/071930
PCT Pub. Date: Apr. 9, 2020

(65) Prior Publication Data
US 2021/0343130 A1 Nov. 4, 2021

(51) Int. Cl.

| | |
|---|---|
| ***G08B 15/00*** | (2006.01) |
| ***G08B 3/10*** | (2006.01) |
| ***G08B 5/36*** | (2006.01) |
| ***G08B 13/16*** | (2006.01) |
| ***G08B 13/196*** | (2006.01) |

(52) U.S. Cl.
CPC ............ *G08B 15/007* (2013.01); *G08B 3/10* (2013.01); *G08B 5/36* (2013.01); *G08B 13/1672* (2013.01); *G08B 13/196* (2013.01)

(58) Field of Classification Search
CPC .......... G08B 15/007; G08B 3/10; G08B 5/36; G08B 13/1672; G08B 13/196
USPC .......................................................... 340/541
See application file for complete search history.

(56) References Cited

U.S. PATENT DOCUMENTS 4,422,068 A 12/1983 Helft et al.
7,012,524 B2 * 3/2006 Hisano .................. G08B 15/02 340/541
7,797,261 B2 9/2010 Yang
(Continued)

OTHER PUBLICATIONS

Avigilon, Avigilon Self-Learning Video Analytics, Feb. 2017, avigilon.com, URL: http://4a54f0271b66873b1ef4-ddc094ae70b29d259d46aa8a44a90623.r7.cf2.rackcdn.com/assets/Uploads/en_US/AllAnalyticsEN.pdf.
(Continued)

*Primary Examiner* — Zhen Y Wu
(74) *Attorney, Agent, or Firm* — Perry + Currier Inc.

(57) ABSTRACT

A presence of a person at a first location within the building is detected using a sensor. Whether the presence of the person at the first location is acceptable is determined in response to detecting the presence of the person at the first location. Then, in response to determining that the presence of the person at the first location is unacceptable, an output device is triggered to output an electronic lure signal to lure the person to a second location that is distant from the first location. The electronic lure signal is based on a category of the person.

18 Claims, 9 Drawing Sheets

(56) References Cited

U.S. PATENT DOCUMENTS

| | | | | |
|---|---|---|---|---|
| 8,044,772 | B1* | 10/2011 | Roe | B60K 28/06 340/576 |
| 9,336,670 | B2* | 5/2016 | Jones, Jr. | G08B 13/19695 |
| 9,741,223 | B2* | 8/2017 | Dodson | G08B 21/02 |
| 9,799,205 | B2* | 10/2017 | Wedig | G08B 25/10 |
| 2002/0191819 | A1* | 12/2002 | Hashimoto | G06V 40/10 382/118 |
| 2003/0151509 | A1* | 8/2003 | Iannotti | G01S 17/04 340/541 |
| 2005/0156743 | A1* | 7/2005 | Gallivan | F41H 13/0068 340/541 |
| 2006/0114749 | A1* | 6/2006 | Baxter | G01S 5/22 367/128 |
| 2008/0088438 | A1* | 4/2008 | Aninye | G08B 21/0286 340/539.13 |
| 2009/0057068 | A1* | 3/2009 | Lin | B66B 1/34 187/392 |
| 2011/0136463 | A1* | 6/2011 | Ebdon | G01C 21/206 455/404.1 |
| 2012/0188081 | A1* | 7/2012 | Van Katwijk | G01S 13/56 340/541 |
| 2014/0111336 | A1* | 4/2014 | Lee | H04M 1/72418 340/540 |
| 2015/0077550 | A1* | 3/2015 | Apelbaum | G06F 18/251 348/143 |
| 2015/0137967 | A1* | 5/2015 | Wedig | G08B 17/10 340/501 |
| 2016/0112835 | A1* | 4/2016 | McConathy | H04W 4/021 455/456.1 |
| 2016/0123741 | A1* | 5/2016 | Mountain | G08B 5/36 701/533 |
| 2016/0232774 | A1* | 8/2016 | Noland | G08B 25/10 |
| 2016/0294572 | A1 | 10/2016 | Shadid et al. | |
| 2017/0024839 | A1* | 1/2017 | Klein | G06Q 90/205 |
| 2017/0098357 | A1 | 4/2017 | Hoy | |
| 2017/0116838 | A1* | 4/2017 | Weksler | G08B 27/003 |
| 2017/0193783 | A1* | 7/2017 | Soderman | G08B 15/00 |
| 2018/0122030 | A1* | 5/2018 | Raz | G06Q 50/265 |
| 2018/0158305 | A1 | 6/2018 | Noland et al. | |
| 2021/0142641 | A1* | 5/2021 | Gandrud | G08B 21/0263 |

OTHER PUBLICATIONS

Cordis, European Comission, "Proactive—Result in Brief—Smarter terrorist detection". May, 2, 2017, URL: https://cordis.europa.eu/article/id/158597-smarter-terrorist-detection.

Gov.uk, "Recognising the Terrorist Threat." , Mar. 24, 2017, URL: https://www.gov.uk/government/publications/recognising-the-terrorist-threat/recognising-the-terrorist-threat.

Grega, Michal, et al. "Automated detection of firearms and knives in a CCTV image." Sensors 16.1 (2016): 47.

Slashdot, BMW Traps a Car Thief by Remotely Locking His Doors:, Dec. 5, 2016, cnet.com, URL: https://yro.slashdot.org/story/16/12/05/0516228/bmw-traps-a-car-thief-by-remotely-locking-his-doors.

U.S. Department of Homeland Security, "Active Shooter—How to Respond" Booklet, Oct. 2008, URL: https://www.dhs.gov/xlibrary/assets/active_shooter_booklet.pdf.

University of Granada, "Artificial Intelligence-Based System Warns When a Gun Appears in a Video." Phys.org, Jul. 7, 2017, URL: https://phys.org/news/2017-07-artificial-intelligence-based-gun-video.html.

ISA/EP, International Search Report and Written Opinion, May 24, 2019, re PCT International Application No. PCT/PL2018/050051.

shockgasm.com, "Best trap for burglar (theives)", YouTube, Dec. 16, 2017, https://www.youtube.com/watch?v=fhkMyWU9cK8, Retrieved on Mar. 18, 2021 from Wayback Machine Web Archive, URL: web.archive.org/web/20171216195440/https:/www.youtube.com/watch?v=fhkMyWU9cK8.

* cited by examiner

SYSTEMS, DEVICES, AND METHODS TO ELECTRONICALLY LURE PEOPLE AT A BUILDING

BACKGROUND OF THE INVENTION

Intrusions and attacks on buildings are a concern for the occupants of buildings and for the public in general. Terrorist attacks, school shootings, hostage takings, and workplace violence are just some examples of the devastation that can be caused by an individual or group set on doing harm. Even when harm does not come to people in a building, damage may occur to the building itself.

People caught up in such an event may suffer from stress and confusion in trying to escape the event or help others affected. Simply attempting to flee a building under attack can be risky. For example, a person may flee in the wrong direction, possibly even moving towards an attacker. Moreover, an attacker may move through the building in an attempt to find and harm the building's occupants.

Conventional solutions to these problems have included physically isolating an attacker from the intended victims. This type of solution, however, may be anticipated by an attacker and may inadvertently expose the building occupants to risk of harm. For example, it may be the case that an attacker becomes isolated with some building occupants. Another known solution is to cut power and other utilities to the building. However, this normally cannot be done without also jeopardizing the safety of the remaining occupants of the building.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

DETAILED DESCRIPTION OF THE INVENTION

The present disclosure relates to techniques to increase security of a building and reduce risk of harm to the occupants of the building and/or to the building itself. A person or group at a building may be detected and categorized as, for example, an offender. The term "person" as used herein is intended to mean a person or group of people.

An electronic lure signal may be outputted at a location in the building to lure the offender towards a location where he/she may be apprehended or trapped. The electronic lure signal may lure the offender away from a location of occupants of the building who the offender may intend to harm. The electronic lure signal may be specifically selected or generated based on the category of person detected, so that luring the person is specific and therefore more effective. For example, if a person is detected as carrying a weapon, then the person may be categorized as an offender who may seek to harm the occupants of the building, and the electronic lure signal may accordingly simulate the sounds (e.g., voices, footsteps, etc.) of such building occupants. The electronic lure signal may be outputted at a location distant from the actual building occupants, so as to lure the offender away from the occupants. Further, the electronic lure signal may be outputted at a location that makes it easier for law enforcement to apprehend the offender. As such, the building itself may be configured to contribute to threat mitigation and/or neutralization.

Figure 1A:
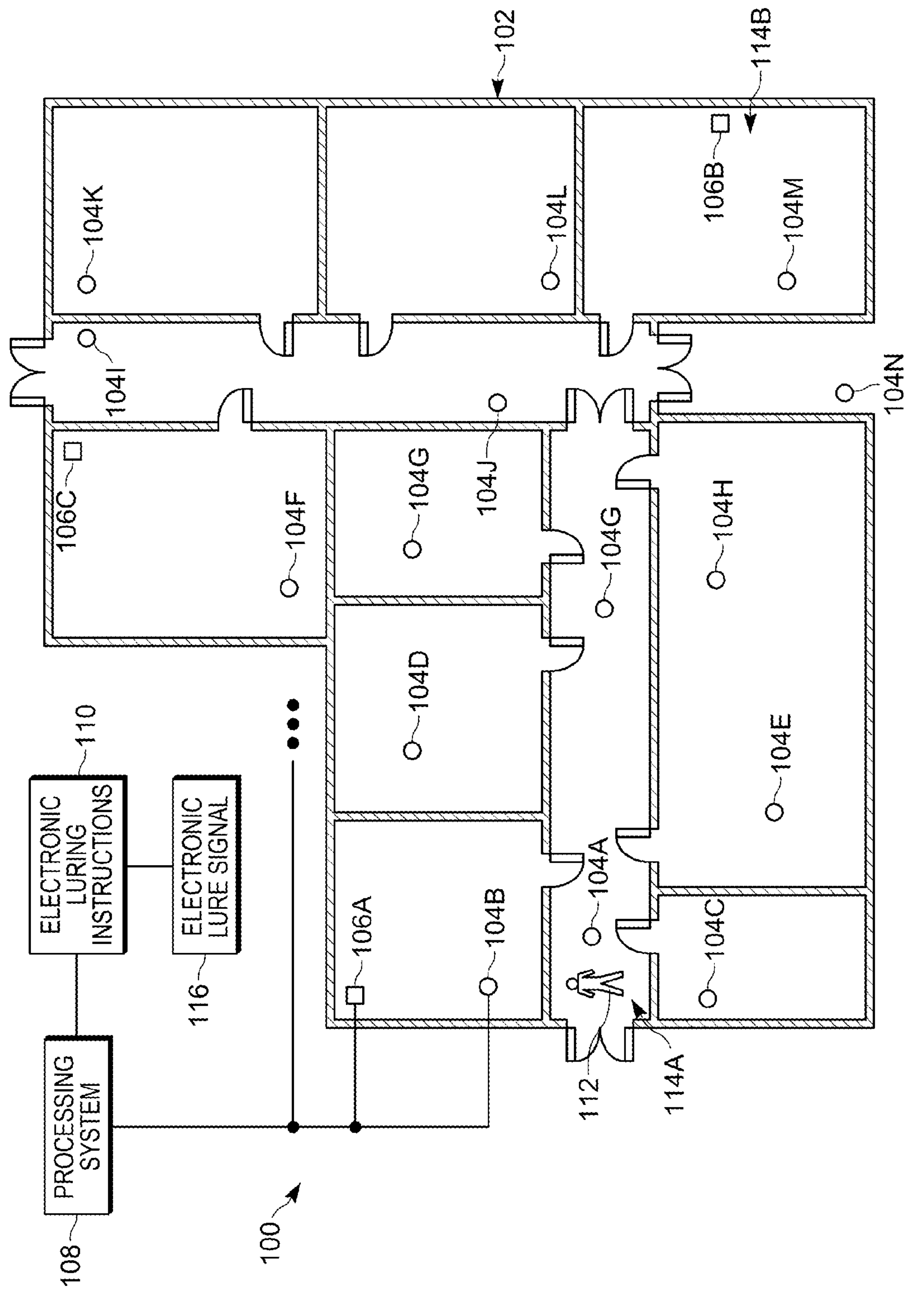
FIG. 1A is a schematic diagram of a system for electronically luring a person at a building.

FIG. 1A shows a system 100 according to an embodiment of the present disclosure. The system 100 is installed at a building 102. The building 102 may include rooms, hallways, open areas, doors, stairs, elevators, escalators, and similar structures.

The system 100 includes a plurality of sensors 104A-N and a plurality of output devices 106A-B distributed throughout the building 102. A sensor 104A-N may be located at a room, hallway, or other structure. A sensor 104A-N may be located outside the building 102 in the vicinity of the building 102, such as at an entranceway, courtyard, or similar location. An output device 106A-B may be located similarly. Sensors may be referred to individually or collectively by reference numeral 104, and suffixes A, B, etc. may be used to identify specific example sensors. The same applies to output devices with regard to reference numeral 106 and as well as any other suffixed reference numeral used herein.

Sensors 104 may include microphones, cameras, or similar. A microphone may capture sound at the building 102 within an audible range of a sensor 104. A camera may capture an image or video in the field of view of a sensor 104. The sensors 104 may capture information about people at the building 102, such as sounds made by made by such people and images or video of such people. The term "image" as used herein may refer to still images, video (i.e., time sequenced images), or both and may include captures in the visible wavelength spectrum, infrared wavelength spectrum, or other spectrums. Sensors 104 may further include devices, such as an extensometer, that measure mechanical or physical characteristics.

Output devices 106 may include directional or unidirectional speakers, display devices (such as monitors, TV screen, projectors, holographic projectors/devices, etc.), lighting devices (such as LEDs, directional spot lights, incandescent bulbs, or arrays of the foregoing), or similar. A speaker may output an audible stimulus within an audible range of the output device 106. A display device may output a visible stimulus, such an image or video. A lighting device may output a visible stimulus, such as ordinary visible wavelength light, infrared light, colored light, or modulated light. The output devices 106 may provide stimuli to people at the building 102 in the form of sound, image, and/or light. The output devices 106 may further include a building sprinkler; an air conditioner; a heating, ventilation, and air conditioning (HVAC) device; a device that emits an olfactory stimulus (offensive or attractive odor); and similar devices that may provide a stimulus to a person.

The system further includes a processing system 108 connected to the plurality of sensors 104 and the plurality of output devices 106. The processing system 108 may be connected to the sensors 104 and output devices 106 via a wired computer network, a wireless computer network, direct wired or wireless connections (e.g., a serial bus), or a combination of such. Examples of suitable computer networks include an intranet, local-area network (LAN), a wide-area network (WAN), the internet, a cellular network, and similar. The processing system 108 may be situated at or near the building 102 or may be located remotely, such as elsewhere in a city, state, country, or other geographic region, including but not limited to a geographically proximate cloud computer cluster. The processing system 108 may be connected to sensors 104 and output devices of a plurality of different buildings 102 to provide the functionality described herein to each connected building 102.

The processing system 108 may execute electronic luring instructions 110 to implement the functionality described herein.

Figure 1B:
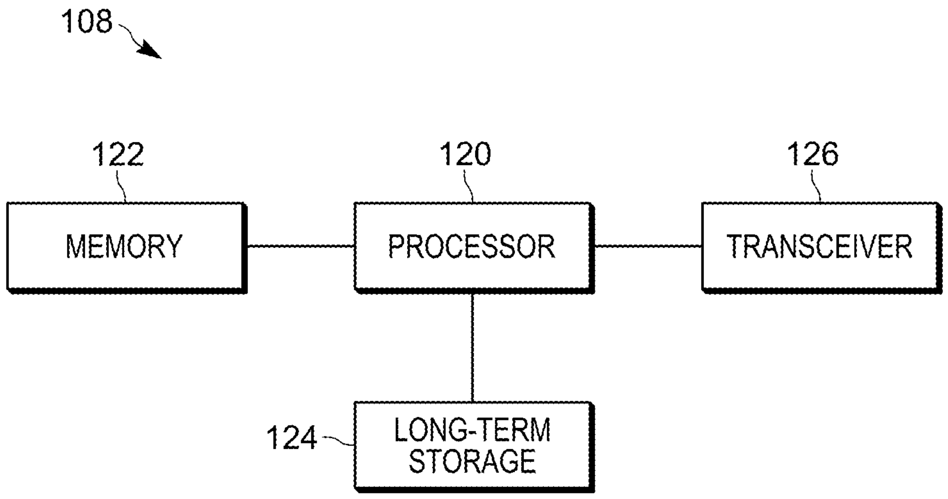
FIG. 1B is a block diagram of the processing system of FIG. 1A.

FIG. 1B shows an embodiment of the processing system 108. The processing system 108 includes a processor 120, memory 122, a long-term storage device 124, and a transceiver 126. Any number of such components may be provided. The processor 120 is connected to the memory 122, the long-term storage device 124, and the transceiver 126 to control operations of such components. Other components may be provided, such as a bus, power supply, user interface, and the like.

The processor 120 may include a central processing unit (CPU), a microcontroller, a microprocessor, a processing core, a field-programmable gate array (FPGA), or a similar device capable of executing instructions. The processor 120 cooperates with the memory 122 to execute instructions.

The memory 122 may include a non-transitory computer-readable medium that may be an electronic, magnetic, optical, or other physical storage device that encodes executable instructions. The machine-readable medium may include, for example, random access memory (RAM), read-only memory (ROM), electrically-erasable programmable read-only memory (EEPROM), flash memory.

The processor 120 and memory 122 cooperate to execute electronic luring instructions 110 with reference to any number of electronic lure signals 116 to implement the functionality (e.g., flowcharts, methods, processes, etc.) described herein.

The long-term storage device 124 may include a non-transitory computer-readable medium that may be an electronic, magnetic, optical, or other physical storage device that encodes executable instructions. The machine-readable medium may include, for example, EEPROM, flash memory, a magnetic storage drive, an optical disc, or similar.

Electronic luring instructions 110 and electronic lure signals 116 may be stored locally in the memory 122 and/or the long-term storage device 124. For example, electronic luring instructions 110 may be stored in the long-term storage device 124, loaded into the memory 122 for execution by the processor 120, and then executed to load electronic lure signal 116 from the long-term storage device 124 and provide such signal 116 to a suitable output device 106.

The transceiver 126 may include a wired and/or wireless communications interface capable of communicating with a wired computer network, a wireless computer network, direct wired or wireless connections (e.g., a serial bus), or a combination of such. Examples of suitable computer networks are described above.

Electronic lure signals 116 may be stored remote to the processing system 108 and provided to the processing system 108 via the transceiver 126. For example, the electronic luring instructions 110 may include instructions to use the transceiver 126 to fetch an electronic lure signal 116 from a remote server.

Figure 2:
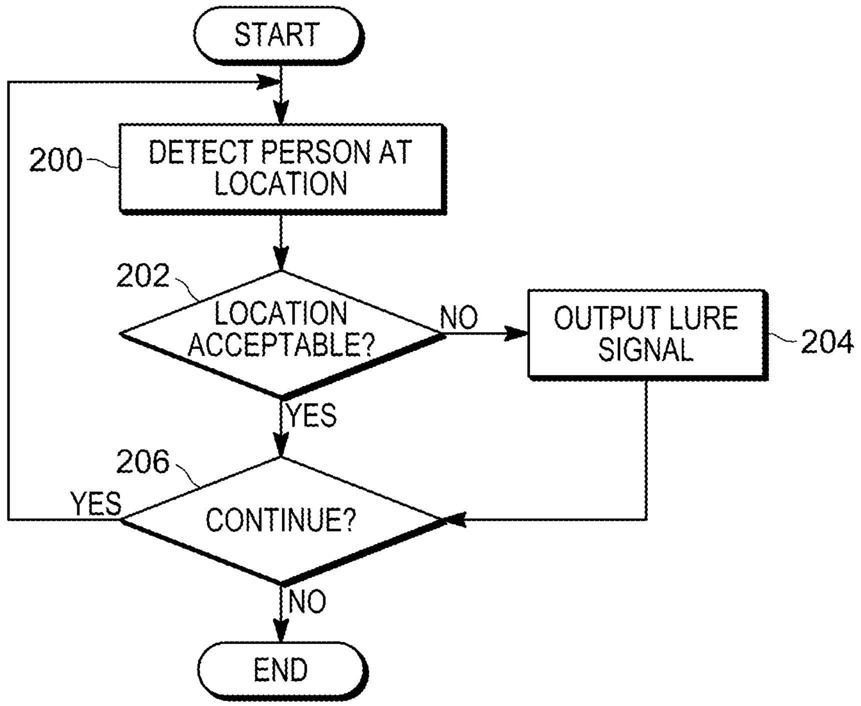
FIG. 2 is a flowchart of a method of electronically luring a person at a building.

With reference to FIG. 2, at block 200, the processing system 108 may detect a person 112 at a first location 114A in the building 102 using at least one of the sensors 104A. For example, a camera may capture an image of the person 112. The processing system 108 may then, at block 202, determine whether it is acceptable for the person 112 to be at the first location 114A. This may be performed by image analysis, for instance, perhaps relative to a database of known visitor attributes. Then, at block 204, in response to determining that it is unacceptable for the person 112 to be at the first location 114A, the processing system 108 may trigger the output of an electronic lure signal 116 via at least one of the output devices 106, such as the output device 106B. Output of the electronic lure signal 116 may include playing a sound at a speaker. The electronic lure signal 116 is configured to urge the person 112 to move by their own free will to a second location 114B away from the first location 114A. It is expected that the person 112 responds to the stimulus provided by a suitable lure signal 116 by proceeding towards the second location 114B. The person 112 may be an offender who is lured to a second location 114B that is distant from the occupants of the building 102, so as to reduce the risk to the occupants, or to a second location 114B that is capable of trapping the person or assisting law enforcement in apprehending the person. The person 112 may be an authorized occupant of the building, i.e., a non-offender, who is lured to a second location 114B that is relatively safe. The process may be continually repeated, via block 206, so as to provide detection and electronic luring functionality to a building 102 over a desired time (e.g., all the time, during specified hours of the day, etc.).

Electronic luring may be attractive or repulsive. That is, an electronic lure signal 116 may provide a stimulus that attracts a person towards a location. In the case of a violent offender, a sound of a potential victim may be a suitable electronic lure signal 116 to attract the offender to a particular location. Conversely, an electronic lure signal 116 that provides light and sound to give the impression of a distant siren may repel a violent offender away from one location and/or towards another location. An attractive lure signal may be used with a repulsive lure signal.

The process shown in FIG. 2 may be performed with the system 100, as described, or with another suitable system.

Whether it is acceptable for the person 112 to be at the first location 114A may depend on a category of the person 112, such as offender or non-offender (e.g., civilian, security guard, etc.). It may be acceptable for a civilian occupant of the building 102 to be at a particular location but unacceptable for an offender to be at that location. For example, a location classified as safe, such as a securely lockable room, may be allowed to have civilians and guards, while it may be preferable to lure an offender away from such location.

Determining whether it is acceptable for the person 112 to be at the first location 114A may include the processing system 108 detecting the person 112 at the first location 114A. That is, the first location 114A may normally be authorized to no one or may selectably be authorized to no one when the system 100 is active. As such, detection of a person, such as by images or sounds of movement captured by a camera or microphone, may be sufficient to determine that the person is an offender and it is not acceptable for him/her to be at the first location 114A. In other words, the unacceptability of the person 112 at the first location 114A may be inferable from the detection of the person 112 at the first location 114A.

Figure 3:
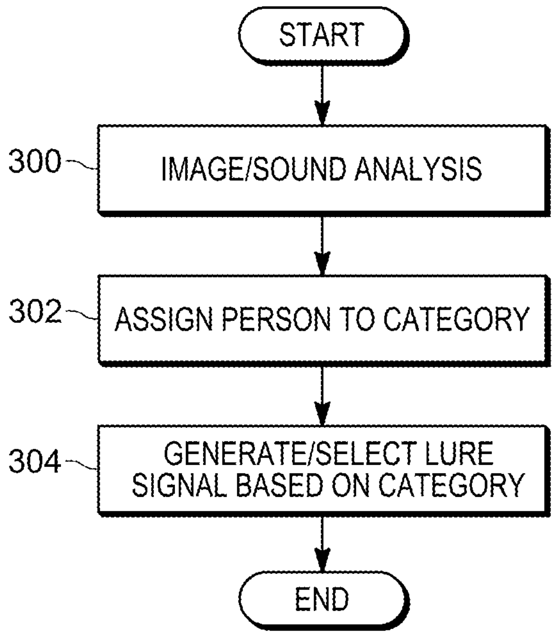
FIG. 3 is a flowchart of a method of obtaining an electronic lure signal based on a category of a person to be lured.

In other examples, as shown in FIG. 3, the processing system 108 is configured to perform an image or sound analysis on an image or sound captured by the sensor 104A. The analysis, at block 300, may assign the person 112 to a category. Categorization of detected people, at block 302, may be used to determine whether or not it is acceptable for a person to be at a location. Additionally or alternatively, categorization of detected people, at block 302, may be used to obtain a category-specific lure signal. It is contemplated that people in the different categories offender and civilian will generally respond to different stimuli.

The image or sound analysis may use a computational process, such as machine learning or image and/or sound mapping, to assign a person to a category. Visible and/or audible characteristics of the person may be processed by a trained machine-learning system to classify the person. Such characteristics may include readily detectable characteristics, such as recognition of a weapon or item of clothing in an image, the sound of a gunshot, facial recognition of the person as compared to a database of authorized building occupants, or similar. Such characteristics may include behavioral characteristics, such as a certain manner of movement through the building; aggressive, coercive, threatening, or violent body movements or actions; or similar. Behavioral characteristics may advantageously allow the analysis to distinguish between offenders and guards/civilians who may be forced by an offender to undertake a certain action.

The analysis may additionally or alternatively use physical cues, such as employee badges that may be visible in captured images, near-field devices that may be carried by authorized building occupants and detected by near-field electromagnetic sensors deployed as a sensor 104, or similar Examples of physical cues and categories that may be assigned based on such cues include: clothing, such as dress code, expected/typical attire, uniforms, and the like, to categorize employees and non-employees; clothing, such as expected/typical attire, to categorize students and non-students; clothing, such as expected/typical attire, to categorize gang members and non-gang members; clothing, such as uniforms, to categorize uniformed professionals (e.g., police) and non-uniformed persons; badges, whether simply printed or containing active elements (e.g., RFID tags), to categorize employees and non-employees; badges, such as metal or embossed badges, to categorize law-enforcement persons (e.g., police) and non-law-enforcement persons; signs/symbols on clothing (e.g., logos) or body (e.g., tattoos) to categorize gang members and non-gang members; signs/symbols (e.g., logos) on clothing or body (e.g., tattoos) to categorize military/ex-military persons and non-military persons; and face gear to categorize persons with infrared vision capability and persons without such capability. Numerous other examples are also contemplated.

The electronic lure signal 116 is selected or generated, at block 304, based on a category of the person 112, as may be determined by such an analysis performed by the processing system 108. As mentioned, the person 112 may be assigned to a category based on sensed information about the person. The electronic lure signal 116 may be selected from a set of predefined stimuli based on the person's category.

Additionally or alternatively, the electronic lure signal 116 represents a stimulus that is generated as needed. This includes synthesizing an electronic lure signal, applying a filter or other modification to a predefined lure signal, playing back a captured image or sound, and similar Playback of captured image or sound may be based on image or sound captured earlier during the same event.

Further, it is noted that the modality of the electronic lure signal 116, i.e., whether it includes audio, image, or both, is independent of the modality of the information on which the electronic lure signal is based. That is, an audio lure signal 116 may be selected based on captured image and vice versa.

Figure 4:
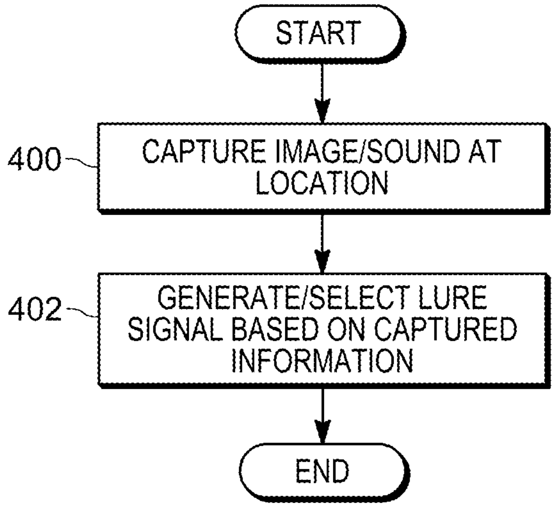
FIG. 4 is a flowchart of a method of obtaining an electronic lure signal based on audio/video information captured at a building.

The electronic lure signal 116 may be based on information captured at the building 102, so that information specific to the event, the building occupants, or an offender may be used to select or generate a convincing lure signal. As shown in FIG. 4, an electronic lure signal may be based on a sound captured by a microphone at the building 102, an image captured by a camera at the building 102, or a combination of such. At block 400, an image and/or sound is captured by a sensor 104 at the building 102. Then, at block 402, an electronic lure signal 116 is generated based on the captured information. Captured information may be processed directly into an electronic lure signal 116. For example, the sound of building occupants requesting help may be recorded and played back to lure an offender towards a specific location. Captured information may be used to determine derivative information, such as a characteristic of an offender, that is then used to obtain a secondary or refined lure signal. For example, if an image of an offender is determined to contain an item of clothing with particular insignia, then the electronic lure signal can be obtained in consideration of that information.

As mentioned, electronic luring may use visible light and/or audible sound. In other embodiments, electronic luring may additionally or alternatively use invisible light, such as infrared light. For example, in one embodiment, an offender may be detected as wearing infrared equipment, such as night-vision goggles. Accordingly, the electronic lure signal 116 may trigger an output device 106 that includes an infrared LED to emit infrared light. The output device 106 and electronic lure signal 116 may be configured to attract the offender and/or may be configured to repel the offender by, for example, outputting a bright flashing infrared pulse or strobe. The offender may thus be attracted or repelled from a location without affecting other occupants of the building who do not have such infrared equipment. Subsequently, if it is detected that the offender has removed his/her infrared equipment, then an electronic lure signal that uses visible light may be used.

Figure 5:
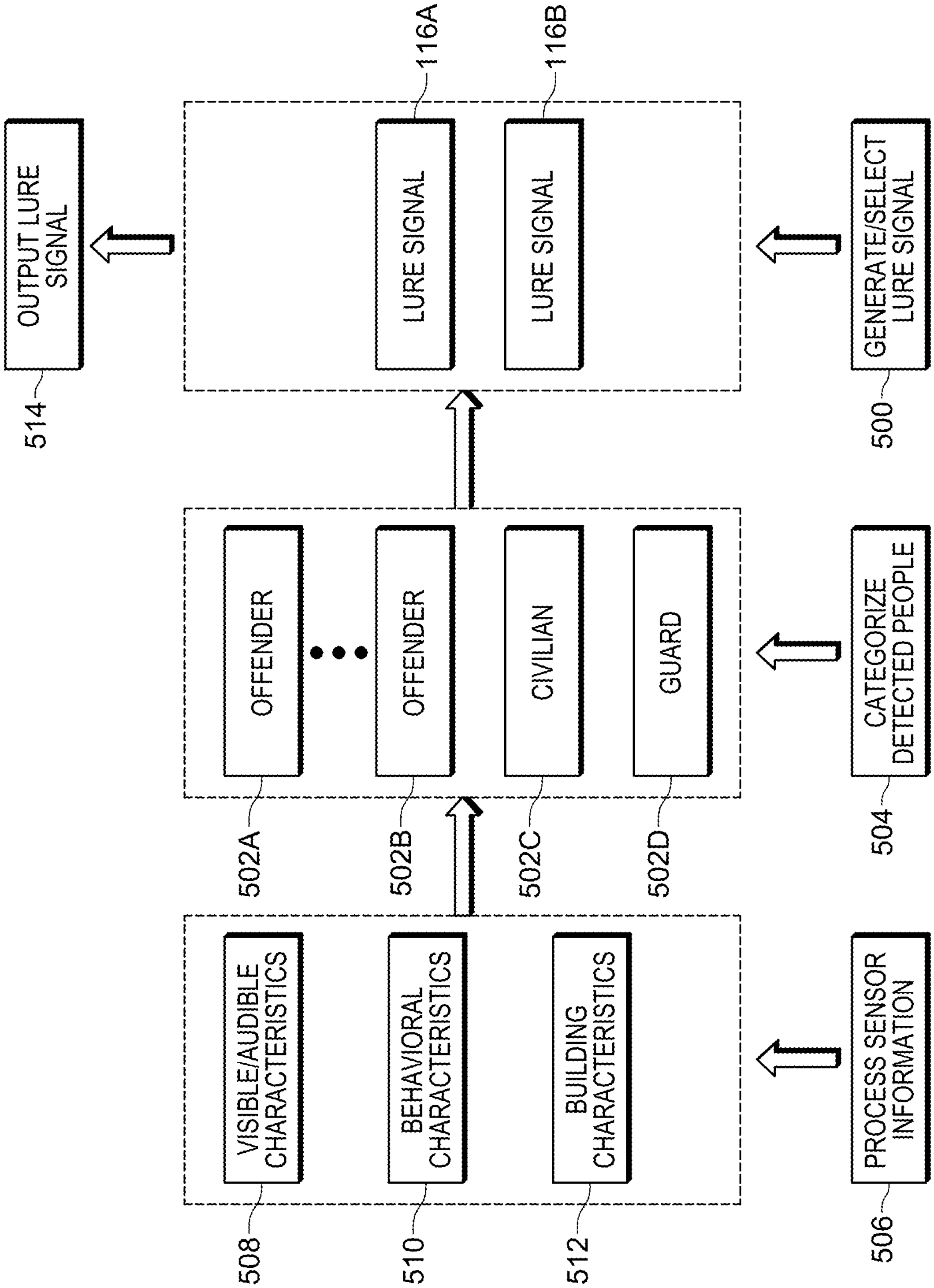
FIG. 5 is a process diagram of using audio/video information captured at the building to categorize people at a building and obtain an electronic lure signal based on a category of a person.

With reference to FIG. 5, different lure signals 116A, 116B may be generated 500 for different categories 502A, 502B, 502C of people detected at a building 102. People detected by sensors 104 at the building 102 may be categorized 504 into, for example, offenders 502A, 502B, civilians 502C, and guards 502D. Different categories of offender, such as violent offender 502A and non-violent offender 502B may be used, so that differentiation may be provided in lure signals that target types of offenders. For example, it may be appropriate to trap a violent offender 502A in a room within the building 102, while it may simply be desired to have a non-violent offender 502B leave the building 102.

In addition, electronically luring non-offenders, such as civilians 502C, is also contemplated. It may be useful to lure civilians 502C to a safe location without alerting an offender 502A, 502B. Hence, rather than overtly directing civilians 502C to a safe location, and possibly also inadvertently directing an offender to the same place, a specific lure signal 116B may be used. Examples of such an electronic lure signal 116B include the sounds of guards, sounds of law enforcement (e.g., a siren), visuals related to law enforcement (e.g., flashing lights), and similar. It is contemplated that, in many cases, civilians 502C will follow such an electronic lure signal 116B while offenders 502A, 502B will not and may even be repelled by such an electronic lure signal 116B.

Further, it is contemplated that targeting an electronic lure signal 116 to a category of non-offender, such as guards and law enforcement, may be avoided, so as to not distract or confuse such individuals with information about the situation that is not accurate. This may help guards and law enforcement maintain situational awareness and more effectively bring an end to the event.

In addition to referencing a category of person that is to be lured, an electronic lure signal 116 may be selected based on a category of person that is not to be lured. For example, when guards 502D are present in the building 102 and electronically luring of guards 502D is to be avoided, then an electronic lure signal 116 representing voices of civilians 502C having normal conversation may be useful to lure a violent offender 502B. This type of lure signal 116 may reduce the risk that guards 502D are also lured. However, when guards 502D are not in the building 102, it may be useful to use an electronic lure signal 116 that represents civilians calling for help. This may provide a stronger stimulus to a violent offender 502B and, since guards are not present, they cannot respond to such a stimulus.

Information captured by the sensors 104 may be processed 506 into derived information about the people at the building 102 and the building 102 itself. Examples of sensors 104 include microphones and cameras, as discussed above, as well as glass-break sensors, door sensors (e.g., open, closed, locked, unlocked), elevator/escalator sensors, proximity sensors, motion sensors, near-field electromagnetic sensors, temperature sensors, and the like. Information captured by the sensors 104 may be used to categorize 502 people at the building 102.

Sensor-derived information may be obtained from data captured by sensors 104 using a trained machine-learning process or similar computational process. Sensor-derived information may include visible/audible characteristics 508 of people at the building 102, behavioral characteristics 510 of people at the building 102, and characteristics 512 of the building itself (e.g., is a door locked or unlocked, is a building alarm sound detected, etc.).

In other examples, sensor-derived information may be directly obtained from data captured by sensors 104 with little or no processing. For example, visible/audible characteristics 508 of people at the building 102 may include the presence or absence of a person at a specific location, as may be directly detected by a sensor 104, such as a camera or motion sensor.

Once selected or generated, an electronic lure signal 116A, 116B may be outputted 514 at a selected location of the building 102, so as to create an audible/visible stimulus to lure the targeted person. Selection of an output device 106 for such location may consider the category and location of the person to be lured and the categories and locations of people that are not to be lured. For example, it may be desirable to direct an offender out the building 102 without routing him/her to areas where civilians are located.

Figure 6:
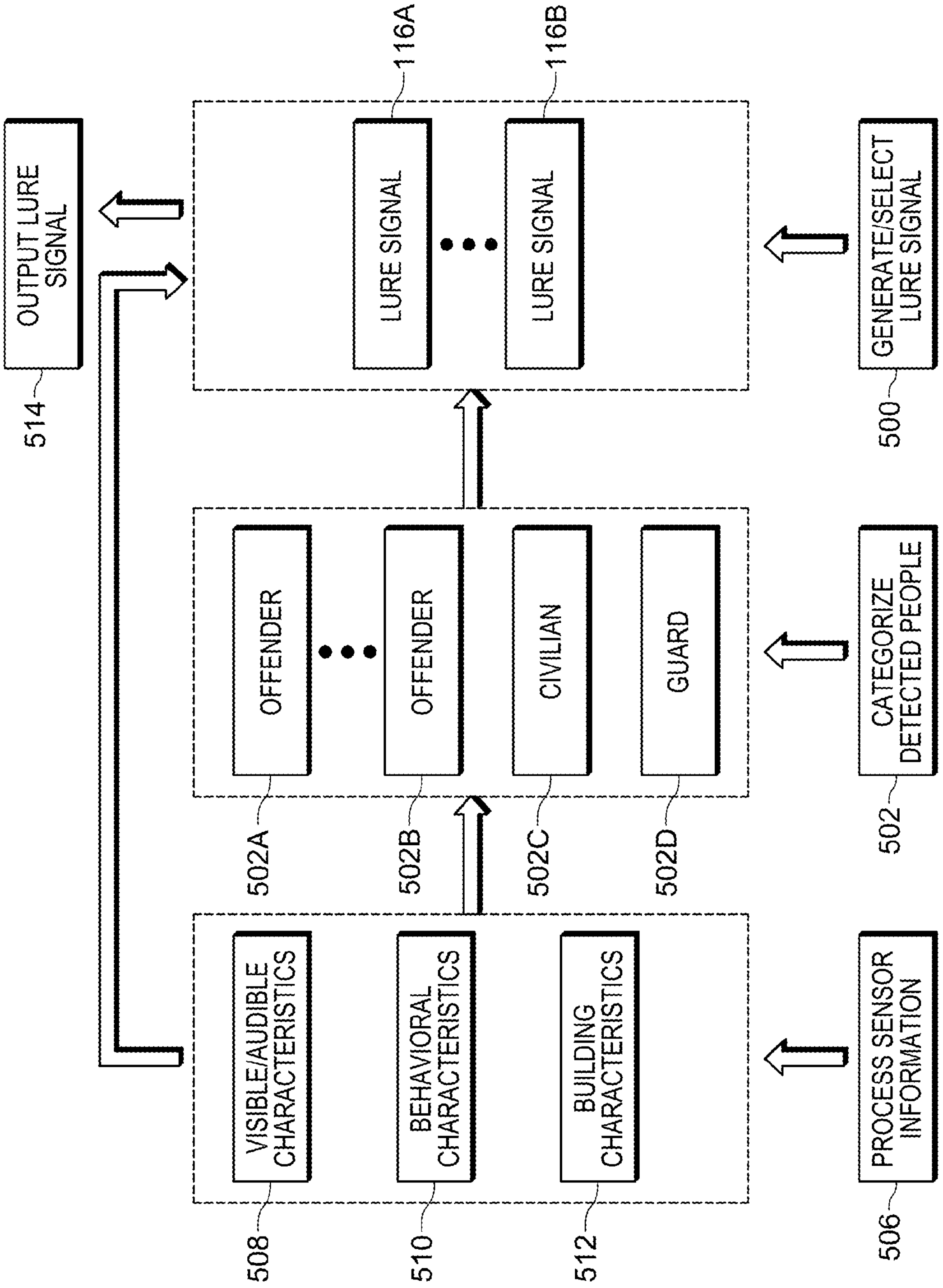
FIG. 6 is a process diagram obtaining an electronic lure signal based on a category of a person and based on audio/video information captured at a building.

FIG. 6 shows that information captured by the sensors 104 may additionally be used to determine lure signals 116A, 116B for different categories of people at the building 102. That is, lure signals 116A, 116B may be category-specific and may further be tuned to characteristics of the individual who is to be lured. For example, an offender carrying a firearm may results in a different lure signal 116A, 116B than an offender carrying a knife.

Figure 7:
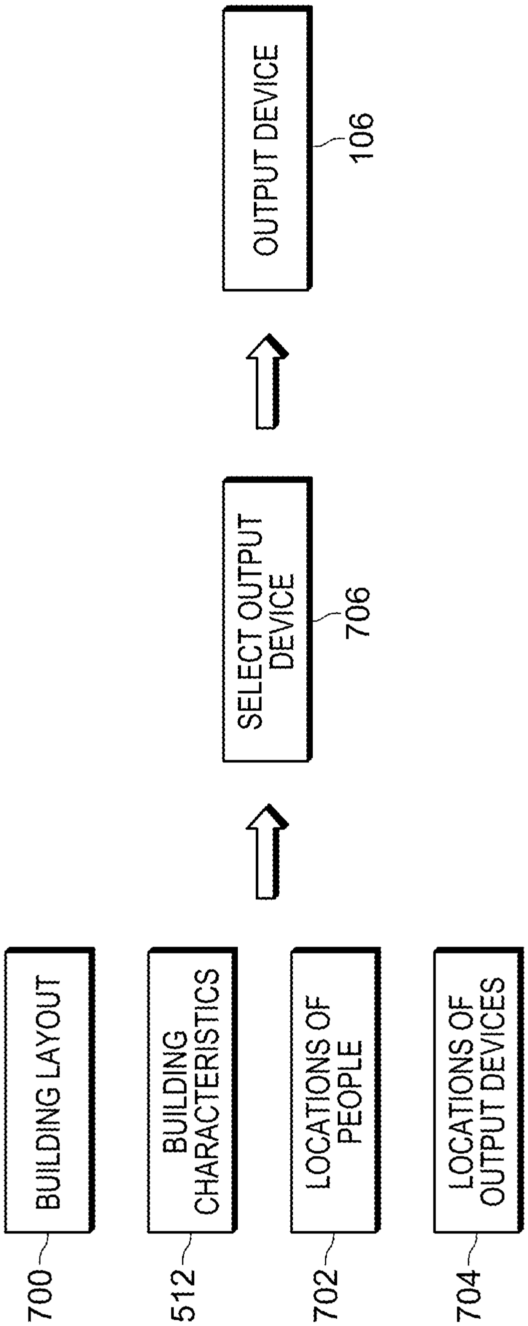
FIG. 7 is a process diagram for selecting an output device for an electronic lure signal.

With reference to FIG. 7, the locations of where lure signals 116 are outputted may be selected based on one or more of stored or detected building layouts 700, building characteristics 512, locations 702 of categorized people within the building 102, and locations 704 of output devices 106 in the building 102.

The building layout 700 may include information describing the physical layout of the building 102, paths between rooms, dimensions and shapes of rooms, locations of doors, obstructions, hazards, entrances, exits, and the like. The building layout 700 may describe, for any given location in the building 102 what are possible paths to other locations and to exits. The building layout 700 may describe sound paths that an audible lure signal may follow. The building layout 700 may be static or may be updateable in case the building 102 is renovated. The building layout 700 may be taken into account, so that pathing for the lured person may be efficient.

Building characteristics 512 may include transitory or dynamic information about the building such as door status (e.g., open, closed, locked, unlocked, etc.), elevator/escalator status (e.g., on or off, floors server, present floor, etc.), and similar. Building characteristics 512 may be updated by sensors 104. Building characteristics 512 may be taken into account for efficient and effective pathing of the lured person.

Locations 702 of categorized people within the building 102 may be available from sensors 104. Such locations 702 may be taken into account, so that so that pathing for the lured person may be configured to avoid or to group with other people. For example, is it contemplated that electronically luring a person categorized as an offender through an area of the building that is occupied by people categorized as civilians should be avoided. In addition, it may be desired in many cases to lure civilians along paths that join up so that safety may be increased by numbers.

Locations 704 of output devices 106 in the building 102 are taken into account as such locations 704 limit where lure signals can be outputted. Further, if a person is to be lured into a target room, it may be desirable to use an output device 106 in the target room or past the target room, from the perspective of the person being lured.

Based on this information, a suitable output device 106 may be selected 706 to output an electronic lure signal 116, so that the targeted category of person is lured to an appropriate location. Selection of the output device 106 may be performed by a computational process, such as trained machine-learning process. In other examples, relatively few locations are used for electronically luring (e.g., a building may have one or two designated trappable locations) and a deterministic process may be used. More than one output device 106 may be selected for a given lure signal.

The output device 106 selected may be updated as electronic luring progresses. For example, a sound may be played in a room adjacent to the person being lured, and as the person moves from room to room the sound moves as well.

Figure 8:
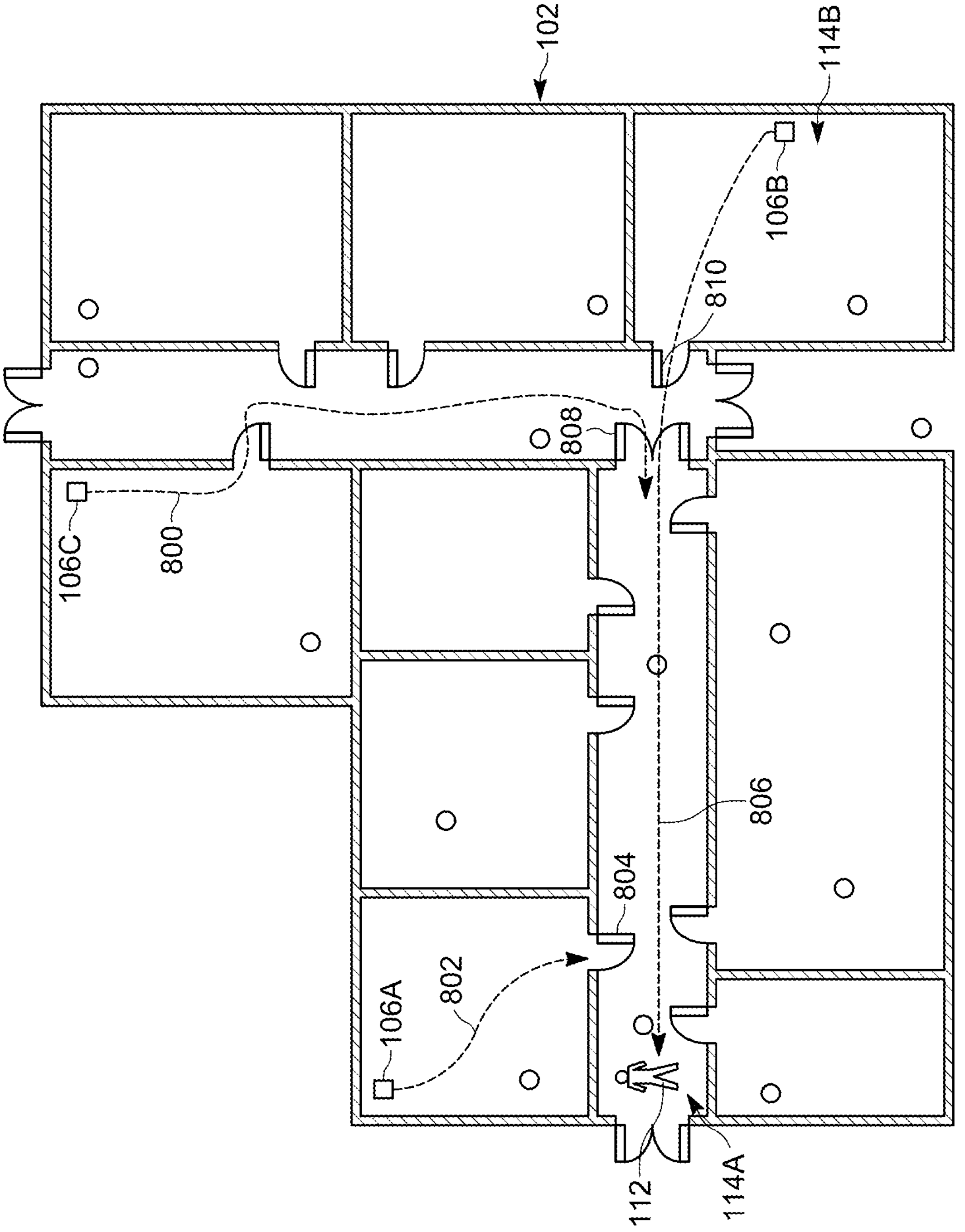
FIG. 8 is a plan view of a building showing selection of an output device based on sound path.

As shown in FIG. 8, when audible stimuli are used, selection of an appropriate location 114B to which to lure a person 112 may be based on sounds paths described by locations 704 of output devices 106A, 106B in the building 102, the building layout 700, and potentially any building characteristics 512 that may affect the travel of sound (e.g., a closed door). Electronic luring using audible stimuli may thus be configured to account for where such stimulus may actually be heard. For example, as depicted, a sound path 800 of an output device 106C may be too long or tortuous for electronic luring to be effective and a sound path 802 of an output device 106A may be blocked or muffled by a closed door 804. As such, neither of the locations of the output devices 106A, 106C may be selected as a trappable location to lure and trap an offender. A sound path 806 of an output device 106B may be suitable and, as such, the location 114B of the output device 106B may be used as a trappable location to lure and trap an offender.

Further with reference to FIG. 8, the building 102 may include physical access mechanisms, such as electronically lockable doors 808, 810. An access-control signal may be triggered to control the physical access mechanism to open and close paths of movement for people at the building 102.

An access-control signal may be used to unlock an electronically lockable door to allow a person 112 to move towards a location. For example, an electronically lockable door 808 located between an offender and a trappable location 114B may be unlocked to allow the offender to move towards a trappable location 114B. Movement paths for civilians seeking to flee from the offender may be opened in a similar but alternative manner.

An access-control signal may be used to lock an electronically lockable door 810 to stop a person 112 from moving away from a location. For example, an electronically lockable door 808 may be locked to prevent egress of an offender from a trappable location 114B.

Figure 9:
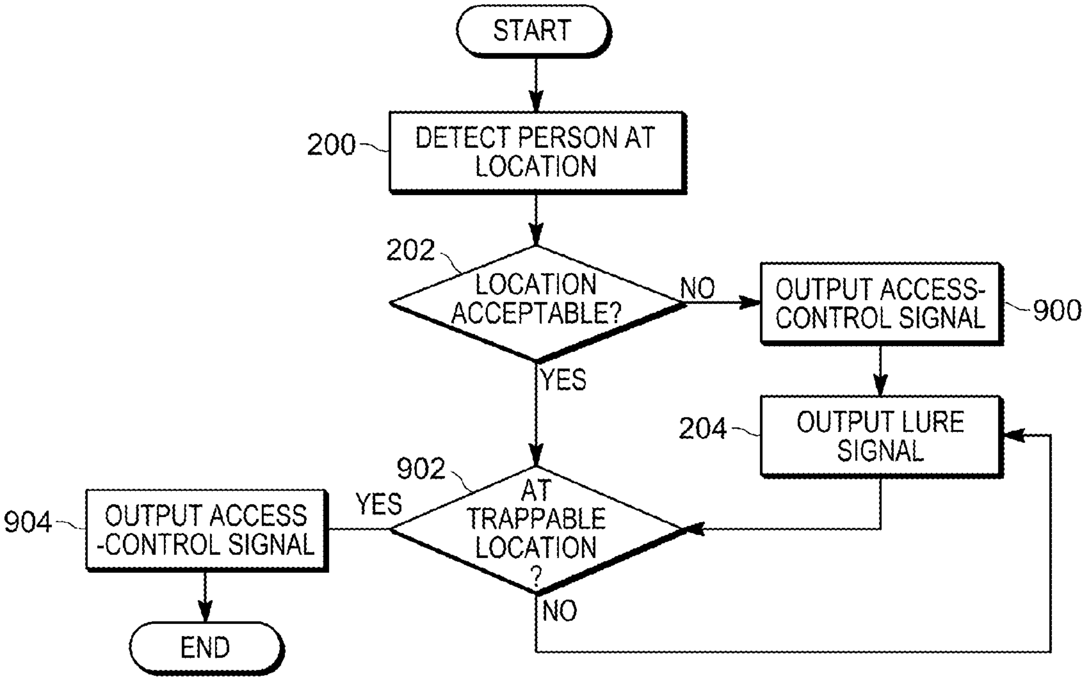
FIG. 9 is a flowchart of a method of electronically luring a person at a building with controlled access to areas in the building.

With reference to FIG. 9, an access-control signal may be outputted, at block 900, before output of an electronic lure signal, so as to open a selected path to a trappable location. Further, another access-control signal may be outputted, at block 904, after a lured offender is detected at the trappable location, via block 902, so as to trap the offender. Detection of the offender at the trappable location may use a sensor at or near the trappable location.

Figure 10:
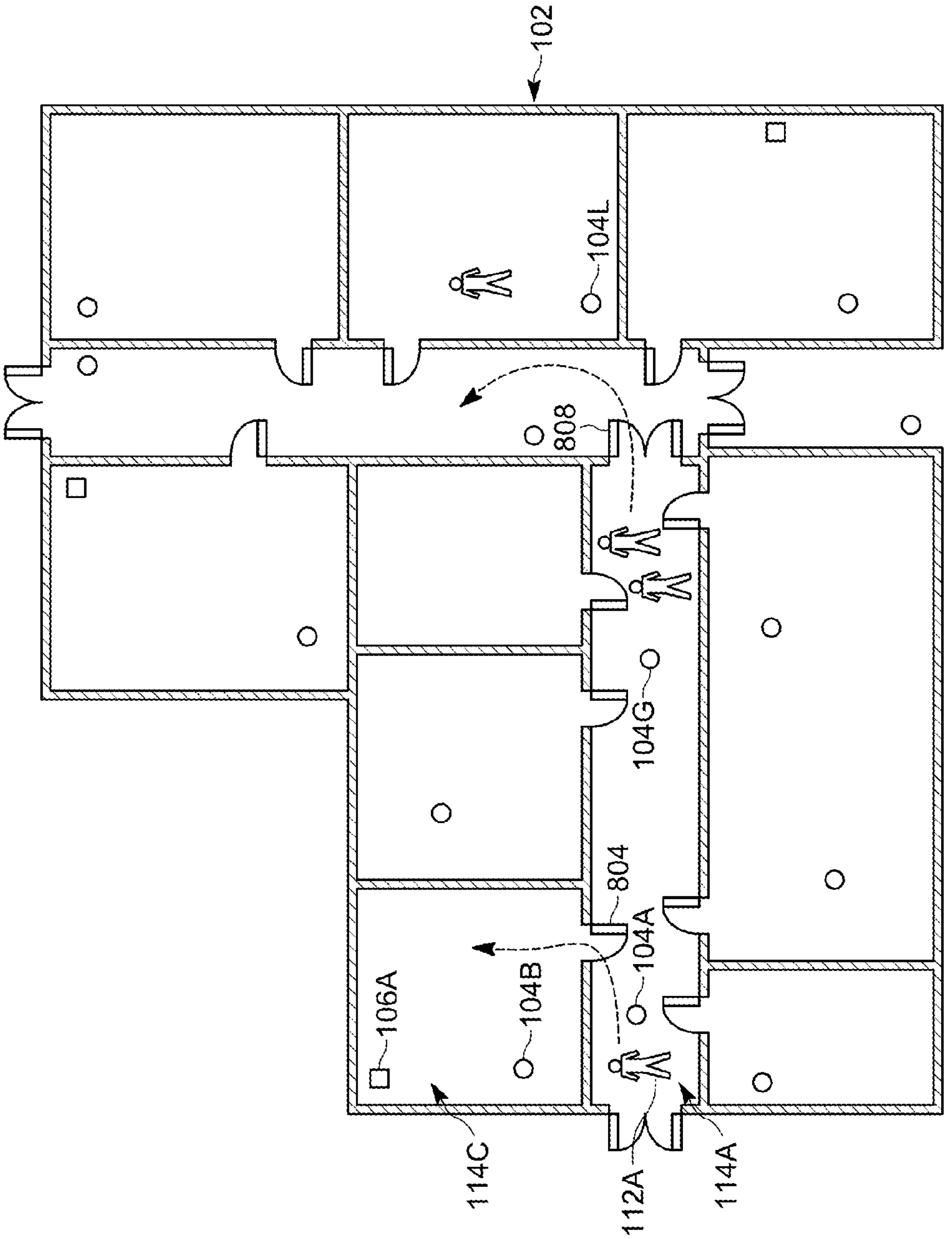
FIG. 10 is a schematic diagram of a building showing an example scenario.

FIG. 10 shows an example scenario. A person 112A enters a building 102. A sensor 104A, such as a camera or microphone, captures information about the person 112A. The person 112A is classified as an offender. Other sensors 104G, 104L capture information about other people in the building 102, and they are classified as civilians. Based on the locations and classifications of the offender and civilians, the system determines that the offender may be trapped in a lockable room 114C. Hence, an electronic lure signal selected in accordance with the description herein is outputted by the output device 106A in the lockable room 114C to lure the offender 112*a* into lockable room 114C. When the system detects the offender 112A in the lockable room 114C, via a sensor 104B, the system controls the door 804 to the room 114C to lock. At the same time, the system may output another lure signal also selected in accordance with the description herein via an output device 106L distant from the output device 106A in the lockable room 114C to lure civilians away from the offender 112A. Once the civilians have left the area, as confirmed by sensors 104G in the area, the system may then lock intermediate doors 808 to further enhance the safety of the civilians.

In view of the above, it should be apparent that an electronic lure signal may be configured for a category of person, such as an offender, and may be outputted to lure the person to an acceptable location at a building. This may reduce the risk of harm to innocent occupants of the building, may increase the likelihood that an offender is trapped or apprehended quickly, and may generally increase the security of the building. An electronic lure signal may be specifically generated or selected with consideration to the characteristics of the people in the building to increase the probably of a positive outcome. Moreover, an electronic lure signal may be outputted at various locations at a building to attract or repel any category of person, so that an offender and others in the building may be lured in concert.

Machine learning and other computational processes as discussed herein which may include, but are not limited to: a generalized linear regression algorithm; a random forest algorithm; a support vector machine algorithm; a gradient boosting regression algorithm; a decision tree algorithm; a generalized additive model; neural network algorithms; deep learning algorithms; evolutionary programming algorithms; Bayesian inference algorithms, reinforcement learning algorithms, and the like.

However, generalized linear regression algorithms, random forest algorithms, support vector machine algorithms, gradient boosting regression algorithms, decision tree algorithms, generalized additive models, and the like may be preferred over neural network algorithms, deep learning algorithms, evolutionary programming algorithms, and the like, in some public safety environments. However, any suitable machine learning algorithm is within the scope of present disclosure.

A machine learning process may be trained with actual sensor information, such as real-time sounds and images of staged events, or may be trained with predefined sensor information, such as sounds and images from a library or from past actual or staged events.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, XZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A non-transitory computer-readable medium with instructions stored thereon, the instructions executable by a processor to:

reference a sensor signal to detect a presence of a person at a first location;

determine whether the presence of the person at the first location is acceptable in response to a detection of the presence of the person at the first location;

in response to a determination that the presence of the person at the first location is unacceptable, trigger an output device to output an electronic lure signal to lure the person to a second location that is distant from the first location, wherein the electronic lure signal is selected based on a determined category of the person identifying the person as an offender; and trigger a physical access mechanism at the second location to prevent egress of the person from the second location.

2. The non-transitory computer-readable medium of claim 1, wherein the instructions are to assign the person to the category.

3. The non-transitory computer-readable medium of claim 2, wherein the instructions are to provide the electronic lure signal further based on a different category of a different person who is not to be lured to the second location.

4. The non-transitory computer-readable medium of claim 1, wherein the instructions are to include in the electronic lure signal a sound that is based on a sound captured by a microphone at a building that contains at least one of the first location and the second location.

5. The non-transitory computer-readable medium of claim 1, wherein the instructions are to include in the electronic lure signal a sound that is based on an image captured by a camera at a building that contains at least one of the first location and the second location.

6. The non-transitory computer-readable medium of claim 1, wherein the electronic lure signal represents an audible stimulus, and wherein the output device comprises a speaker to output the audible stimulus.

7. The non-transitory computer-readable medium of claim 1, wherein the electronic lure signal represents a visible stimulus, and wherein the output device comprises a display device or a lighting device to output the visible stimulus.

8. The non-transitory computer-readable medium of claim 1, wherein the instructions are further to trigger an access-control signal to control the physical access mechanism at a building that contains at least one of the first location and the second location.

9. The non-transitory computer-readable medium of claim 8, wherein the physical access mechanism comprises an electronically lockable door, wherein the access-control signal is to unlock the electronically lockable door to allow the person to move towards the second location.

10. The non-transitory computer-readable medium of claim 8, wherein the physical access mechanism comprises an electronically lockable door, wherein the access-control signal is to lock the electronically lockable door to stop the person from moving away from the second location.

11. The non-transitory computer-readable medium of claim 1, wherein the instructions are to determine whether the presence of the person at the first location is acceptable based on the category.

12. The non-transitory computer-readable medium of claim 11, wherein the sensor signal represents an image captured by a camera, and wherein the instructions are to perform image analysis on the image to assign the person to the category.

13. The non-transitory computer-readable medium of claim 11, wherein the sensor signal represents a sound captured by a microphone, and wherein the instructions are to perform audio analysis on the sound to assign the person to the category.

14. A system comprising:

a plurality of sensors distributed throughout a building;

a plurality of output devices distributed throughout the building; and a processor connected to the plurality of sensors and the plurality of output devices, the processor configured to detect a person at a first location in the building using at least one sensor of the plurality of sensors, to determine whether the person is authorized to be at the first location, and output an electronic lure signal via at least one output device of the plurality of output devices to lure the person to a second location away from the first location in response to determining that the person is not authorized to be at the first location, wherein the electronic lure signal is based on a category of the person identifying the person as an offender;

wherein the at least one output device comprises a speaker, and wherein the processor is further configured to identify as the second location a trappable location in the building based on a sound path from the speaker to the first location, and wherein the processor is to provide the electronic lure signal as representative of an audible stimulus configured to lure the person towards the trappable location.

15. The system of claim 14, wherein the audible stimulus is configured to repel the person away from the first location and to lure the person to the second location.

16. The system of claim 14, wherein the at least one output device comprises a display device or a lighting device, and wherein the processor is to provide the electronic lure signal as representative of a visible stimulus.

17. The system of claim 14, wherein the at least one output device comprises an electronic lock of an electrically lockable door of the building, and wherein the processor is to provide the electronic lure signal as representative of a locking or unlocking signal of the electrically lockable door.

18. A method to provide security to a building, the method comprising:

detecting a presence of a person at a first location within the building using a sensor;

determining whether the presence of the person at the first location is acceptable in response to detecting the presence of the person at the first location;

in response to determining that the presence of the person at the first location is unacceptable, triggering an output device to output an electronic lure signal to lure the person to a second location that is distant from the first location, wherein the electronic lure signal is based on a category of the person identifying the person as an offender; and triggering a physical access mechanism at the second location to prevent egress of the person from the second location.

* * * * *